United States Patent [19]

Sicard

[11] 4,062,571
[45] Dec. 13, 1977

[54] RAPIDLY CONNECTABLE AND DISCONNECTABLE PIPE UNION

[75] Inventor: Hubert Sicard, Marseilles, France

[73] Assignee: Compagnie Maritime d'Expertises - Comex, Marseilles, France

[21] Appl. No.: 688,316

[22] Filed: May 20, 1976

[30] Foreign Application Priority Data

May 30, 1975   France .................................. 75.17356

[51] Int. Cl.² ............................................. F16L 35/00
[52] U.S. Cl. .................................. 285/26; 285/39;
      285/137 R; 285/330; 285/356; 285/388
[58] Field of Search .................. 285/84, 85, 388, 387,
      285/362, 25, 26, 377, 27, 28, 81, 82, 29, 137 R,
      39, 330, 386, 276, 321, 354, 356, 357, 353;
      403/342, 349

[56] References Cited

U.S. PATENT DOCUMENTS

| 1,329,760 | 2/1920 | Fulton | 285/386 X |
| 2,438,679 | 3/1948 | Porker | 285/137 R |
| 3,393,927 | 7/1968 | Kelly et al. | 285/388 X |
| 3,503,634 | 3/1970 | Cadiou | 285/137 R |

FOREIGN PATENT DOCUMENTS

| 410,208 | 3/1910 | France | 285/353 |

*Primary Examiner*—Dave W. Arola
*Attorney, Agent, or Firm*—Lewis H. Eslinger

[57] ABSTRACT

Rapidly connectable and disconnectable pipe union, comprising a bush on which are fixed one or more pipes provided with a notched flange. It comprises, in addition, a union body on which are fixed one or more pipes. This body comprises an outer threading on which is screwed a nut provided with a toothed rim and a sliding sleeve, connected to the nut by a ring. This nut comprises a toothed rib which meshes behind the notched flange. One application of the present invention is the connection of underwater pipes with one another or onto underwater apparatus by divers or by remotely controlled devices.

8 Claims, 5 Drawing Figures

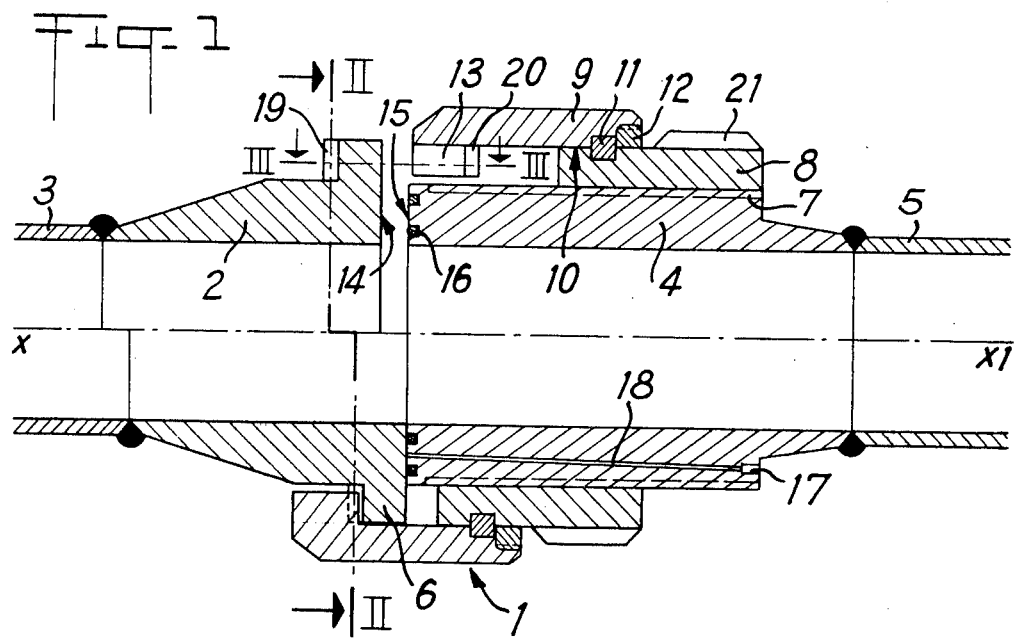
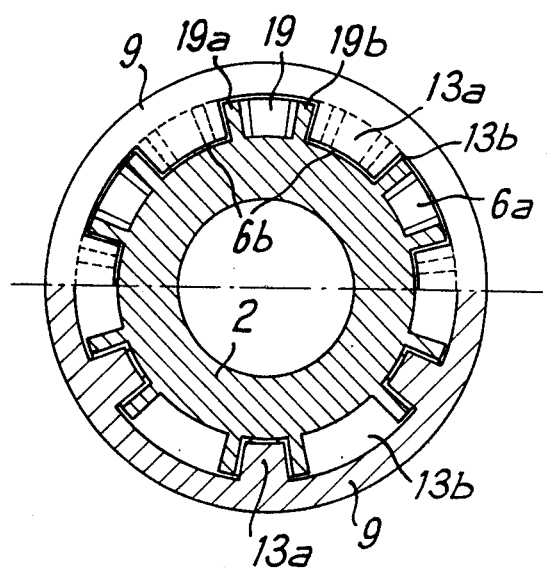
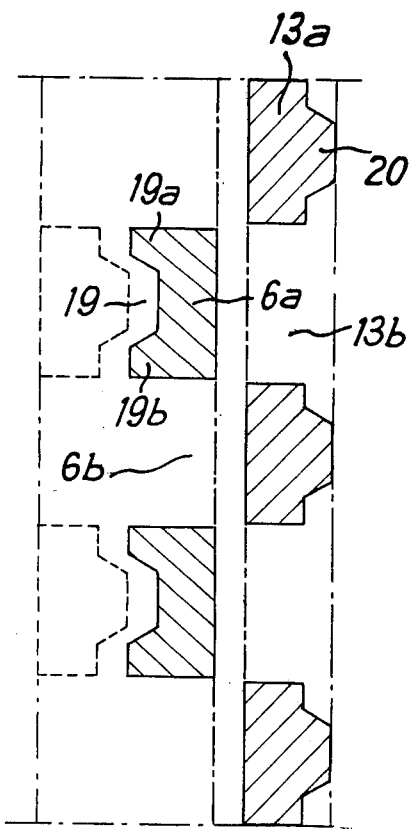

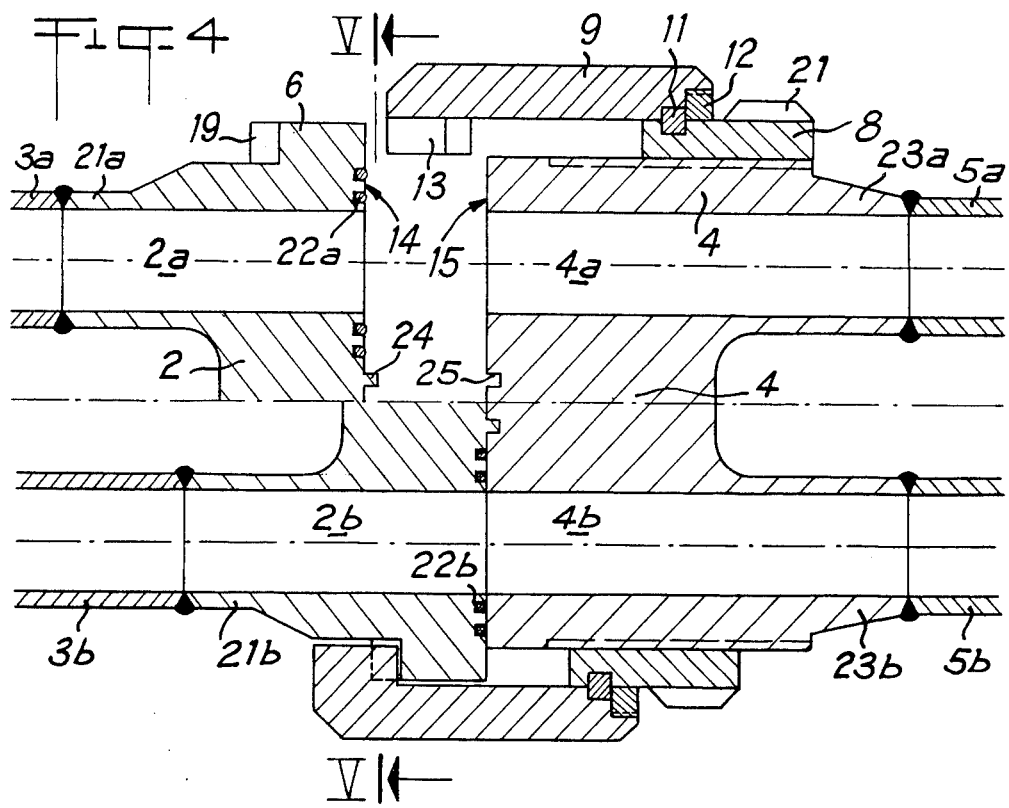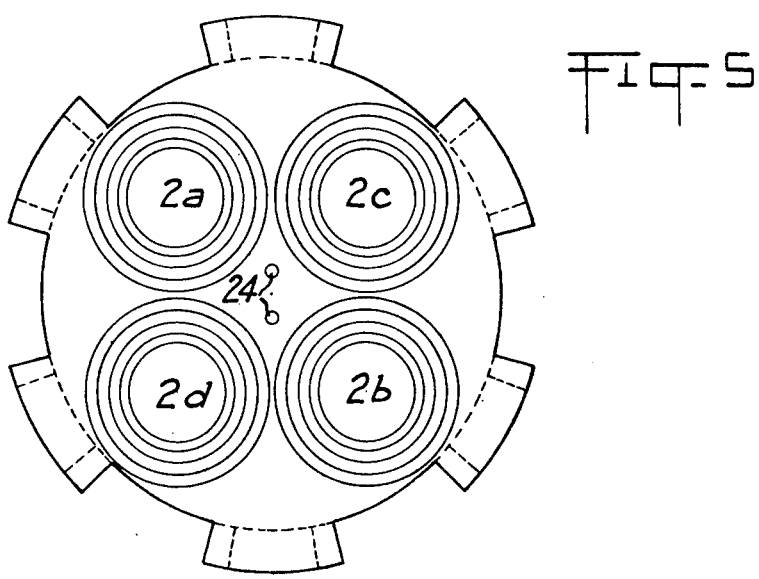

RAPIDLY CONNECTABLE AND DISCONNECTABLE PIPE UNION

The present invention relates to new, rapidly connectable and disconnectable pipe unions.

The technical sector of the invention is that of the construction of pipe union accessories.

A particular, but non-exclusive, application of the unions according to the invention, is the connection of underwater pipes to one another or to submarine installations by divers.

A number of threaded unions are known which are composed of two half-unions, one having a male thread, the other a female thread. These unions are not suitable for connecting underwater pipes of large diameter, which are subjected to considerable stresses.

Unions are also known which comprise anchoring jaws formed by several jaws which are tightened by means of a nut on a smooth pipe end, on a swivel-joint bush or behind a flange. These unions may withstand considerable stresses and are suitable for underwater pipes, but they are relatively heavy and expensive.

Finally, so-called instant unions are known which are composed of two half-unions comprising intermeshing teeth, in which one of the half-unions is fixed and the other comprises a rotary ring, so that by pivoting the ring by a part of a revolution, the teeth of said latter are engaged behind those of the fixed half-union and the union is tightened. The known instant unions are suitable for pipes of small diameter conveying fluids at low pressure, but could not be used on underwater pipes of large diameter conveying fluid at a high pressure, since they are not sufficiently tight and cannot resist high tractive forces.

It is an object of the present invention to provide unions similar to instant unions, which are easy to connect and disconnect, even under water, and which have the mechanical resistance and tightness required for underwater installations.

These objects are attained by means of a rapidly connectable and disconnectable union composed:

- on the one hand of a bush comprising on its outer periphery a notched flange, on which are fixed one or more pipes to be connected. - on the other hand of an externally threaded union body on which are fixed one or more of the pipes to be connected;
- of a nut screwed on said union body; - and a sliding sleeve moving in translation with but independent in rotation from said nut, which is provided on its internal periphery with a toothed rib so that it may be engaged through said notched flange and the teeth of the rib may then be positioned behind the teeth of the flange by rotating the sleeve, then the union may be tightened by means of the nut.

The bush and the union body each comprise a front face perpendicular to the axis and one of the two faces comprises, around the orifice of each of the pipes, at least one groove containing a seal.

The result of the invention is a new product constituted by a rapidly connectable and disconnectable pipe union.

This union has the advantage of being easier to manufacture than the unions provided with anchoring jaws. It presents the advantage over the known instant unions, of being tightened by means of a nut which may be provided on its outside with means of enabling it to be easily manoeuvred on the sea-bed.

In particular, the nut may comprise on its outer periphery a toothed rim which may be manoeuvred by means of racks actuated by hydraulic jacks mounted on gantries placed above the union or by means of worms which enable the tightening force to be reduced. These worms may also be mounted on gantries which are positioned above the union, this enabling the tightening and loosening manoeuvres of a union placed at a depth inaccessible to divers, to be remotely controlled. A worm provided with a manoeuvring wheel may also be permanently mounted in a casing fast with the union body or with the nut so that the tightening and loosening manoeuvres of the union by a diver are easy.

Another advantage of these unions resides in the fact that the mobile part is entirely retractable behind the front surface 15.

The invention will be more readily understood on reading the following description with reference to the accompanying drawings, in which:

FIG. 1 is a longitudinal section through a union according to the invention.

FIG. 2 is a transverse section along line II-II of FIG. 1.

FIG. 3 is an exploded view of a tangential section along III-III of FIG. 1.

FIGS. 4 and 5 are sections through a multi-pipe union.

Referring now to the drawings, FIG. 1 shows a union, generally designated by the reference 1, which comprises on the one hand a bush 2 fixed by any means, e.g. welded, on the end of a pipe 3 axis x - x1 and on the other hand a union body 4, also fixed by any means on the end of a pipe 5 of axis x-x1.

The external periphery of the bush 2 is provided with a notched flange 6, i.e. a flange formed of successive teeth 6a, separated from each other by notches 6b. The teeth and notches are preferably of the same width.

The body 4 comprises an external thread 7 on which is screwed a nut 8. This nut is assembled on a sliding bush 9 so that they move in translation but are independent in rotation. For example, the nut 8 is partly fitted in the bush 9 and two identical grooves are made on either side of the joining surface 10. These grooves, place opposite each other, form a channel in which a ring 11 is placed. A stop ring 12 is screwed onto the end of the sleeve 9 after the ring 11 has been placed in the channel.

The internal periphery of the bush 9 is provided with a toothed rib 13, i.e. formed of projecting teeth 13a separated by notches 13b. The teeth and the notches are preferably of the same width and this width is substantially equal to that of the teeth 6a and notches 6b so that the rib 13 may pass through the flange 6.

The bush 2 and body 4 each comprise a front face 14 and 15, respectively, perpendicular to axis $x—x1$.

One of these two faces, e.g. face 15, comprises two grooves, centred on axis $x—x1$, containing seals 16. A detection member 17, placed at the end of a conduit 18 which terminates between the two grooves, enables the seal of the assembled union to be verified.

The upper half of FIG. 1 shows the union disconnected and the lower half shows it in connected position.

To connect the union, the teeth 13a are engaged through the notches 6b by moving the sleeve 9 by means of the nut 8 without it rotating. The bush 9 is then rotated to place the teeth 13a opposite the rear face of the teeth 6a, then the union is tightened by rotating nut 8 in the opposite direction, without the bush rotating.

The fact that the sliding bush 9 does not rotate with the nut 8 enables the teeth 13a to be engaged through the notches 6b, then to be returned opposite the teeth 6a and finally enables the union to be tightened by maintaining the teeth 13a in this position.

FIG. 2 is a transverse section showing, in its upper half, the bush 2 and flange 6 formed by teeth 6a separated by notches 6b. To the rear of the plane of section, is seen the bush 9 and the toothed rib 13 formed by teeth 13a placed opposite the notches 6b and separated by indentations 13b.

In the lower part of the Figure are shown the bush 2 and the teeth 6a as well as the sleeve 9 and the teeth 13a placed in contact with the teeth 6a.

The rear face of each tooth 6a comprises a central groove 19 defined by two radial ribs 19a, 19b.

The internal face of each tooth 13a comprises a central radial rib 20. These details are more clearly apparent in the exploded view of FIG. 3.

This Figure shows in solid lines, the relative position of the teeth 6a and the teeth 13a which corresponds to the upper part of FIG. 1. In broken lines, it shows the relative position of these elements after the rib 20 has passed through the flange 6 and after it has been rotated to place the teeth 13a opposite teeth 6a. The ribs 20 are noted to engage in the grooves 19 when the union is tightened and prevent the sleeve from rotating with respect to the bush 2.

Of course, the ribs and grooves 19, 19a, 19b and 20 could be replaced by other hollow and projecting elements fitting into one another and fulfilling the same function.

The periphery of the nut 8 is provided with means enabling it to be manoeuvred. For unions of small diameter, these means are constituted, for example, by a polygonal surface and they are tightened and loosened by means of a spanner.

For unions of larger diameter, e.g. for diameters larger than 100 mm, the nut 8 comprises a toothed rim 21. This is manoeuvred either with the aid of racks moved by hydraulic jacks mounted on gantries placed astride the union or with the aid of worms which may form part of a mobile equipment or be permanently mounted in a casing fixed to the body of the union.

These worms may be equipped with a manoeuvring wheel or be moved by hydraulic motors. They enable the stresses to be reduced. This type of union is well adapted to underwater works because it enables the stresses which must be exerted by the divers to be reduced and it may even be provided with remotely controlled devices.

FIG. 4 shows a longitudinal section through a multipipe union and FIG. 5 a view of the front face of the bush of this union. The parts homologous to those of FIGS. 1 to 3 are designated by the same references.

The union which has been shown makes it possible simultaneously to connect four pipes 3a, 3b, 3c, 3d end to end with four pipes 5a, 5b, 5c, 5d. The bush 2 comprises four conduits 2a, 2b, 2c, 2d each extending to the rear by a pipe end such as 21a, 21b on which one of the pipes to be connected, 3a, 3b, 3c, 3d, is fixed by any means, e.g. by welding.

The front face 14 comprises, around the orifice of each of conduits 2a to 2d, two grooves each containing a seal such as 22a, 22b. The bush 2 comprises a notched flange 6.

Similarly, the union body 4 has four conduits 4a, 4b, 4c, 4d passing therethrough, each extending to the rear by a pipe end such as 23a, 23b on which is fixed one of the pipes to be connected, 5a, 5b, 5c, 5d, by any means.

The nut 8 and the sleeve 9 are identical to those of the unions of FIGS. 1 to 3.

The bush 2 and union body 4 comprise, respectively, studs 24 which fit into recesses 25 in order to position the conduits 2a to 2c in line with conduits 4a to 4c.

What is claimed is:

1. A rapidly connectable and disconnectable pipe union for connecting pipes in end to end relation comprising a bush secured to a pipe end and having a radially notched outer peripheral flange including a plurality of radially outwardly extending teeth; an externally threaded union body secured to the end of another pipe; a nut threadedly engaged with said union body, a sliding sleeve receiving a portion of said nut and surrounding a portion of said union body, and means for connecting said sliding sleeve to said nut for longitudinal movement therewith while permitting free relative rotation therebetween; said sliding sleeve having an externally extending toothed rib formed therein comprising a plurality of radially inwardly extending teeth having notches formed therebetween whereby said teeth on said rib may be inserted through the notches on said flange and the slide rotated to position said rib teeth behind said flange teeth for tight clamping engagement with each other upon rotation of said nut in a direction to move the nut and slide along the union body away from said bush.

2. A pipe union as defined in claim 1 wherein said sleeve and nut have concentric oppositely facing annular grooves formed therein defining a closed channel therebetween and said connecting means comprises a ring-key received in said channel whereby said sleeve and nut can rotate freely with respect to each other but will move longitudinally together.

3. A pipe union as defined in claim 9 adapted to connect pipes underwater and wherein said nut has a toothed rim formed on its outer periphery.

4. A pipe union as defined in claim 1 wherein the teeth on said flange and rib have engaging surfaces with the engaging suraces of the teeth on one of said flange and rib each have a central groove formed therein and two radially extending ribs on opposite sides of the groove; and the engaging surfaces on the teeth of the other of said flange and rib, each having a centrally located radially extending rib which is generally complementary to the recesses of the teeth on said one of said flange and rib.

5. A rapidly connectable and disconnectable pipe union for simultaneously connecting several pipes in end-to-end relation comprising a bush having a plurality of longitudinally extending passages formed therein secured to the end of a plurality of pipes respectively aligned with said passages, said bush including a radially notched outer peripheral flange having a plurality of radially outwardly extending teeth formed therein separated by radially spaced notches, an externally threaded union body having a plurality of longitudinally extended passages formed therein of a number equal to the number of passages in said bush and secured to the ends of a plurality of pipes respectively aligned with said passages; a nut threadedly engaged with said union body and having a toothed rim formed on its outer periphery; a sliding sleeve receiving a portion of said nut and surrounding a portion of said union body, and means for connecting said sliding sleeve to said nut for longitudinal movement therewith while permitting free relative rotation therebetween; said sliding sleeve having an internally extending toothed rib formed therein comprising a plurality of radially inwardly extending teeth having notches formed therebetween whereby said teeth on said rib may be inserted through the notches on said flange and the slide rotated to position said rib teeth behind said flange teeth for tight clamping engagement with each other upon rotation of said nut in a direction to move the nut and slide along the union body away from said bush.

6. A pipe union as defined in claim 5 wherein said sleeve and nut have concentric oppositely facing annular grooves formed therein defining a closed channel therebetween and said connecting means comprises a ring-key received in said channel whereby said sleeve and nut can rotate freely with respect to each other but will move longitudinally together.

7. A pipe union as defined in claim 6 wherein said bush and union body each have front facing surfaces engaging each other when said flange and rib teeth are clampingly engaged; said front faces including cooperating means for mating the bush and union in a predetermined relation to each other wherein their passages align.

8. A pipe union as defined in claim 7 wherein said cooperating means comprises at least two studs formed on one of said front faces and at least two recesses formed on the other of said front faces.

* * * * *